United States Patent
Byun et al.

(10) Patent No.: US 9,570,780 B2
(45) Date of Patent: Feb. 14, 2017

(54) RECHARGEABLE BATTERY

(71) Applicant: SAMSUNG SDI CO., LTD., Yongin-si, Gyeonggi-do (KR)

(72) Inventors: Sangwon Byun, Yongin-si (KR); Minseok Koo, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 258 days.

(21) Appl. No.: 13/936,332

(22) Filed: Jul. 8, 2013

(65) Prior Publication Data

US 2014/0234669 A1    Aug. 21, 2014

(30) Foreign Application Priority Data

Feb. 21, 2013    (KR) .................. 10-2013-0018609

(51) Int. Cl.
*H01M 2/26*    (2006.01)
*H01M 10/42*    (2006.01)
(Continued)

(52) U.S. Cl.
CPC ....... *H01M 10/4257* (2013.01); *H01M 2/0202* (2013.01); *H01M 2/0217* (2013.01);
(Continued)

(58) Field of Classification Search
None
See application file for complete search history.

(56) References Cited

U.S. PATENT DOCUMENTS

2011/0183193 A1*   7/2011  Byun et al. ................... 429/178
2011/0244280 A1*  10/2011  Byun .................. H01M 2/0404
                                                    429/61
(Continued)

FOREIGN PATENT DOCUMENTS

EP    2-333-866 A1    6/2011
EP    2373808 A1    10/2011
(Continued)

OTHER PUBLICATIONS

Search Report mailed Jun. 5, 2014 in corresponding European Patent Application No. 13181475.8.

*Primary Examiner* — Jonathan Crepeau
(74) *Attorney, Agent, or Firm* — Lee & Morse, P.C.

(57) ABSTRACT

A rechargeable battery including an electrode assembly including a first and second electrode, and a separator interposed between the first and second electrode; a case receiving the electrode assembly and having a top end opening; a cap assembly sealing the top end opening of the case, the cap assembly including a first terminal part and a second terminal part outwardly protruding; and a first collector plate received inside the case and electrically connecting the first electrode and the first terminal part, wherein the first collector plate includes a first lead part including a first electrode connection part connected to the first electrode, a first terminal connection part connected to the first terminal part, and a first connecting part electrically connecting the first electrode connection part and the first terminal connection part; and a first resin part on the first lead part, the first resin part covering the first connecting part.

16 Claims, 4 Drawing Sheets

(51) Int. Cl.
*H01M 2/06* (2006.01)
*H01M 2/12* (2006.01)
*H01M 2/02* (2006.01)
H01M 2/34 (2006.01)
H01M 4/66 (2006.01)
H01M 10/0585 (2010.01)
H01M 10/0587 (2010.01)

(52) U.S. Cl.
CPC ........... *H01M 2/0237* (2013.01); *H01M 2/06* (2013.01); *H01M 2/1241* (2013.01); *H01M 2/26* (2013.01); *H01M 2/263* (2013.01); *H01M 2/348* (2013.01); *H01M 2/347* (2013.01); *H01M 4/667* (2013.01); *H01M 10/0585* (2013.01); *H01M 10/0587* (2013.01); *H01M 2200/103* (2013.01)

(56) References Cited

U.S. PATENT DOCUMENTS

2011/0300414 A1 12/2011 Baek
2012/0214050 A1 8/2012 Kim

FOREIGN PATENT DOCUMENTS

| EP | 2-551-940 A2 | 1/2013 |
|---|---|---|
| JP | 2011-159569 A | 8/2011 |
| KR | 10-2011-0005164 A | 1/2011 |
| KR | 101042808 B1 | 6/2011 |
| KR | 20110109769 A | 10/2011 |
| KR | 10-2011-0134259 A | 12/2011 |
| KR | 20120096157 A | 8/2012 |

* cited by examiner

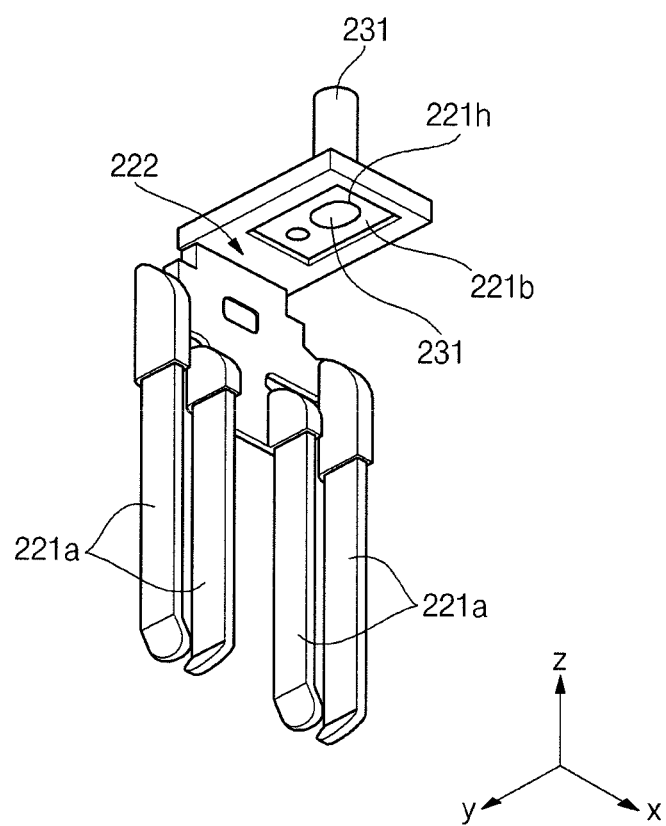

RECHARGEABLE BATTERY

CROSS-REFERENCE TO RELATED APPLICATION

Korean Patent Application No. 10-2013-0018609 filed on Feb. 21, 2013, in the Korean Intellectual Property Office, and entitled: "RECHARGEABLE BATTERY," is incorporated by reference herein in its entirety.

BACKGROUND

1. Field

Embodiments relate to a rechargeable battery.

2. Description of the Related Art

Unlike a primary battery that is incapable of being recharged, a rechargeable battery is a battery that can be repeatedly charged and discharged. A low-capacity rechargeable battery (having a single cell) may be used in small portable electronic apparatuses, such as mobile phones, laptop computers, and camcorders. A large-capacity rechargeable battery (that includes a plurality of rechargeable cells connected in a pack shape) may be used as a power source for driving a motor of a hybrid electric vehicle and the like. Rechargeable batteries may be manufactured in various shapes, for example a cylindrical shape and a prismatic shape.

SUMMARY

Embodiments are directed to a rechargeable battery.

The embodiments may be realized by providing a rechargeable battery including an electrode assembly including a first electrode, a second electrode, and a separator interposed between the first electrode and the second electrode; a case receiving the electrode assembly therein and having a top end opening; a cap assembly sealing the top end opening of the case, the cap assembly including a first terminal part and a second terminal part outwardly protruding; and a first collector plate received inside the case and electrically connecting the first electrode and the first terminal part, wherein the first collector plate includes a first lead part including a first electrode connection part connected to the first electrode, a first terminal connection part connected to the first terminal part, and a first connecting part electrically connecting the first electrode connection part and the first terminal connection part; and a first resin part on the first lead part, the first resin part covering the first connecting part.

The first resin part may be insert-molded to the first lead part to be integrally engaged with the first lead part.

The first resin part may be made of one of polypropylene and perfluorinated acid.

The first connecting part may have one side connected to the first electrode connection part and another side connected to the first terminal connection part, the first connecting part extending from a top portion of the first electrode connection part to then be bent toward an upper portion of the electrode assembly.

The first connecting part may include a fuse region, the fuse region having a smaller sectional area than other regions of the first connecting part.

The fuse region may be positioned inside the first resin part.

The fuse region may be positioned at one side of the first connecting part connected to the first terminal connection part and has a fuse hole formed therein.

The first resin part may be insert-molded to the first lead part that is engaged with a first fastening terminal of the first terminal part, the first resin part covering the first connecting part and the first terminal connection part.

The rechargeable battery may further include a second collector plate received inside the case, the second collector plate electrically connecting the second electrode and the second terminal part.

The second collector plate may include a second lead part including a second electrode connection part connected to the second electrode, a second terminal connection part connected to the second terminal part, and a second connecting part electrically connecting the second electrode connection part and the second terminal connection part; and a second resin part on the second lead part, the second resin part covering the second connecting part.

The second resin part may be insert-molded to the second lead part to be integrally engaged with the second lead part.

The second resin part may be made of one of polypropylene and perfluorinated acid.

The second connecting part may have one side connected to the second electrode connection part and another side connected to the second terminal connection part, the second connecting part extending from a top portion of the second electrode connection part to then be bent toward an upper portion of the electrode assembly.

The second resin part may be insert-molded to the second lead part that is engaged with a second fastening terminal of the second terminal part, the second resin part covering the second connecting part and the second terminal connection part.

The cap assembly may include a cap plate sealing the case; and a vent plate in the cap plate, the vent plate being configured to be opened when an internal pressure of the case exceeds a preset pressure.

The rechargeable battery may further include a first short-circuit plate on a short-circuit hole in the cap plate, the first short-circuit plate being electrically connected to the cap plate and upwardly convexly protruding when the internal pressure of the case exceeds a preset pressure; and a second short-circuit plate upwardly spaced apart from the first short-circuit plate and being electrically connected to the second terminal part.

BRIEF DESCRIPTION OF THE DRAWINGS

Features will become apparent to those of skill in the art by describing in detail exemplary embodiments with reference to the attached drawings in which:

FIG. 5 illustrates an enlarged perspective view of a first collector plate and a fastening terminal of FIG. 4.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like numbers refer to like elements throughout.

Figure 1A:
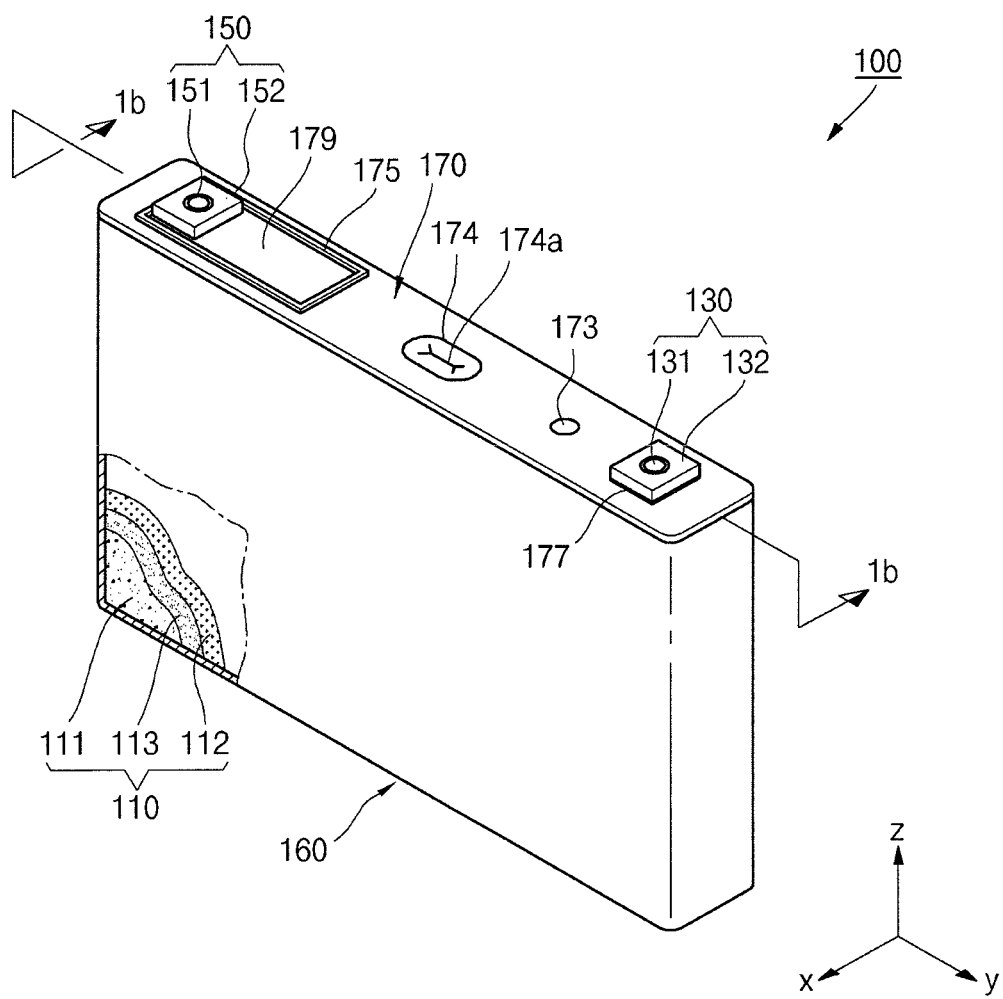
FIG. 1A illustrates a perspective view of a rechargeable battery according to an embodiment.
Figure 1B:
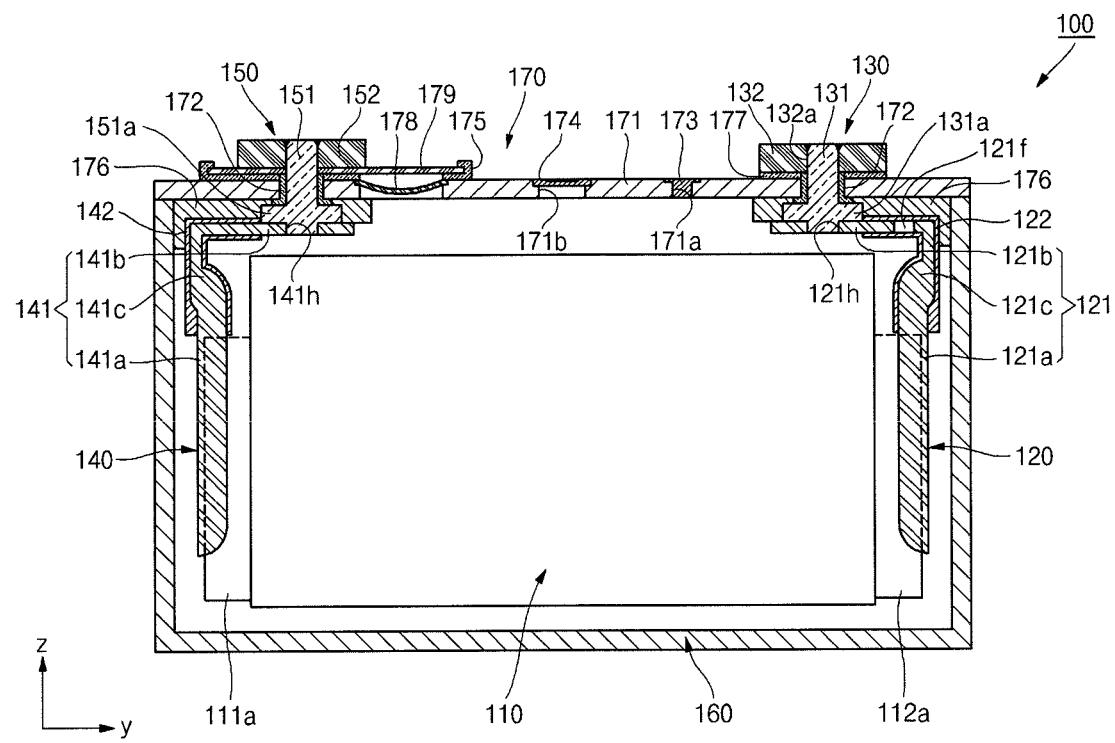
FIG. 1B illustrates a cross-sectional view taken along the line 1b-1b of FIG. 1A.

FIG. 1A illustrates a perspective view of a rechargeable battery according to an embodiment. FIG. 1B illustrates a cross-sectional view taken along the line 1b-1b of FIG. 1A.

As shown in FIGS. 1A and 1B, the rechargeable battery 100 according to the present embodiment may include an electrode assembly 110, a first collector plate 120, a first terminal part 130, a second collector plate 140, a second terminal part 150, a case 160, and a cap assembly 170.

The electrode assembly 110 may be formed by winding or laminating a stacked structure of a first electrode 111, a separator 113, and a second electrode 112, which may be formed of thin plates or layers. For example, the first electrode 111 may function as a positive electrode, and the second electrode 112 may function as a negative electrode, and vice versa.

The first electrode 111 may be formed by applying a first active material, e.g., a transition metal oxide, to a first electrode current collector of a metal foil, e.g., aluminum. The first electrode 111 may include a first electrode uncoated portion 111a that is not coated with the first active material. The first electrode uncoated portion 111a may function as a path of the flow of current between the first electrode 111 and the outside of the first electrode 111. However, the embodiments do not limit the material of the first electrode 111.

The second electrode 112 may be formed by applying a second active material, e.g., graphite or carbon, to a second electrode collector plate made of a metal foil, e.g., copper or nickel. The second electrode 112 may include a second electrode uncoated portion 112a that is not coated with the second active material. The second electrode uncoated portion 112a may function as a path of the flow of current between the second electrode 112 and the outside of the second electrode 112. However, the embodiments do not limit the material of the second electrode 112.

The separator 113 may be interposed between the first electrode 111 and the second electrode 112 for preventing a short-circuit therebetween and for allowing movement of lithium ions. The separator 113 may be formed of, e.g., polyethylene (PE), polypropylene (PP), or a composite film of PE and PP. However, the material of the separator 113 is not limited thereto.

A first collector plate 120 and a second collector plate 140 may be coupled with opposing ends of the electrode assembly 110 to be electrically connected to the first electrode 111 and the second electrode 112, respectively.

The electrode assembly 110 may be received in the case 160 with an electrolyte. In an implementation, the electrolyte may include an organic solvent, e.g., ethylene carbonate (EC), propylene carbonate (PC), diethyl carbonate (DEC), ethyl methyl carbonate (EMC), or dimethyl carbonate (DMC), and a lithium salt, e.g., $LiPF_6$ or $LiBF_4$. The electrolyte may be a liquid, solid, and/or gel electrolyte.

Figure 2:
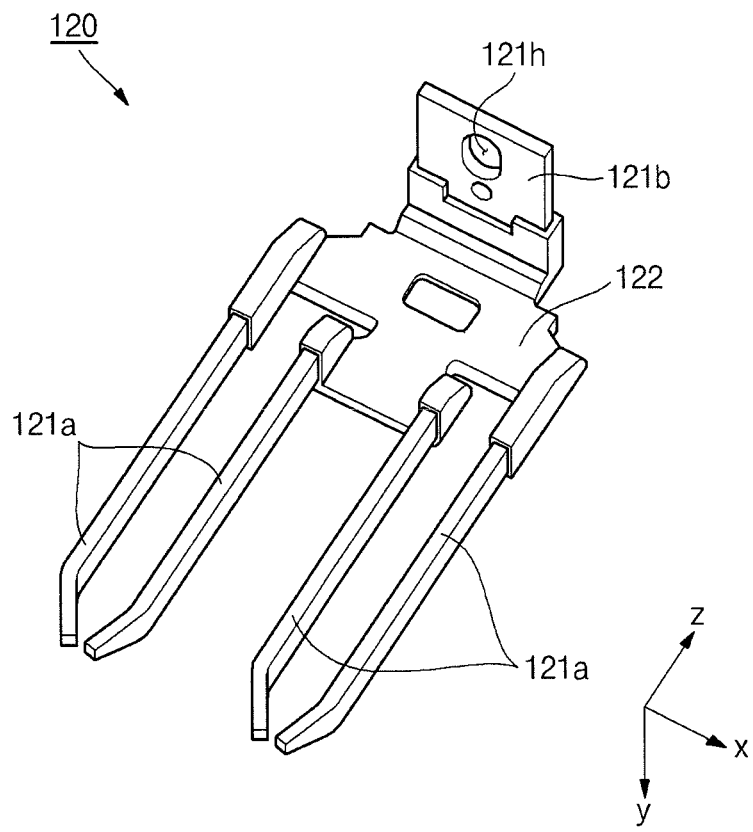
FIG. 2 illustrates an enlarged perspective view of a first collector plate of FIG. 1A.
Figure 3:
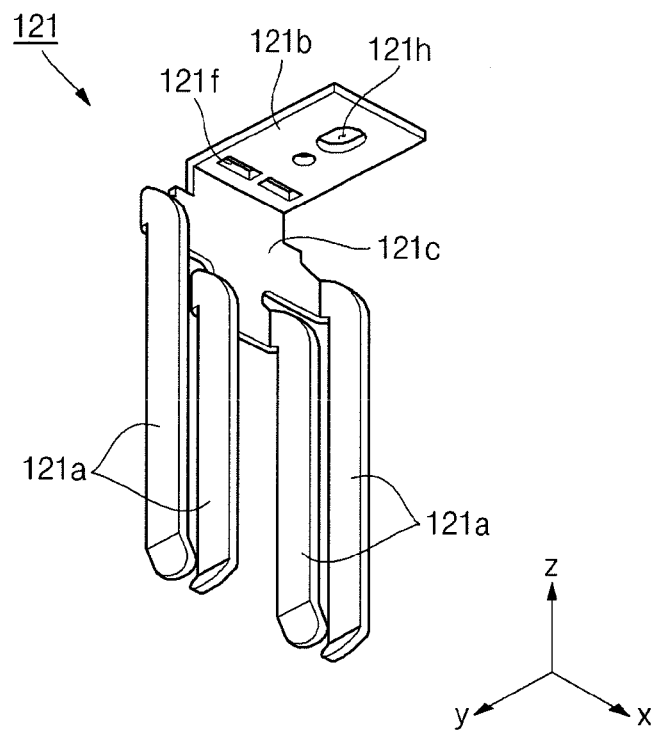
FIG. 3 illustrates a perspective view of a first lead part of the first collector plate of FIG. 2.

FIG. 2 illustrates an enlarged view of the first collector plate 120, and FIG. 3 illustrates a first lead part 121 of the first collector plate. A configuration of the first collector plate 120 will now be described with reference to FIGS. 1A, 1B, 2, and 3.

The first collector plate 120 may include a first lead part 121 (which may be made of a metal or an equivalent thereof) and a first resin part 122 covering a portion of the first lead part 121.

The first lead part 121 may be electrically connected to the first electrode 111 and the first terminal part 130. For example, the first lead part 121 may include a first electrode connection part 121a (connected to the first electrode 111), a first terminal connection part 121b (connected to the first terminal part 130), and a first connecting part 121c (connecting the first electrode connection part 121a and the first terminal connection part 121b). The first lead part 121 may be formed as a single body, e.g., may be integrally formed as a single piece. In an implementation, the first lead part 121 may be formed in a substantially inverted-L shape, i.e., a ']' shape. The first lead part 121 may be made of, e.g., aluminum or an aluminum alloy. However, the material of the first lead part 121 is not limited thereto.

The first electrode connection part 121a may be welded to the first electrode uncoated portion 111a of the electrode assembly 110 and may be arranged to stand in a vertical direction, e.g., in an up and down direction in FIG. 1B. The first electrode connection part 121a may include as many first electrode connection parts as electrode assemblies that are received in the case 160. For example, each of the first electrode connection parts 121a may be welded to the first electrode uncoated portion 111a of the electrode assembly 110. The number of the first electrode connection parts 121a is exemplified as 4 in FIG. 2, but the embodiments are not limited thereto.

The first terminal connection part 121b may be welded to the first terminal part 130 and may be arranged in a substantially horizontally lying position to be parallel with the cap plate 170, which will be described below. A first fastening hole 121h may be formed in the first terminal connection part 121b, and may pass through top and bottom surfaces of the first terminal connection part 121b. A first fastening terminal 131 (of the first terminal part 130) may be fitted into the first fastening hole 121h to be engaged therewith. For example, the first fastening hole 121h may be sized to correspond to the first fastening terminal 131 to facilitate receiving of the first fastening terminal 131 therein.

The first connecting part 121c may have one side thereof connected to or coupled with the first electrode connection part 121a and another side thereof connected to or coupled with the first terminal connection part 121b. The first connecting part 121c may extend from a top end of the first electrode connection part 121a, and may be bent and may further extend a predetermined length in a substantially inverted-L shape, i.e., ']' shape. For example, the first connecting part 121c may extend from the first electrode connection part 121a in a vertically standing shape, and may be vertically bent to be parallel with the cap plate 170, which will be described below, to then be connected to the first terminal connection part 121b.

A fuse region (having a smaller sectional area than other regions of the first connecting part 121c) may be provided at the other side of the first connecting part 121c. For example, the first connecting part 121c may include a fuse hole 121f (formed at its other side) that passes through top and bottom surfaces of the first connecting part 121c and that includes the fuse region having a smaller sectional area than other regions of the first connecting part 121c. The fuse hole 121f may have an oblong elongated shape in a widthwise direction and, in an implementation, may include two fuse holes. However, the embodiments do not limit the shape and number of the fuse hole 121f. The fuse region may be melted by heat generated when a short-circuit occurs in the rechargeable battery 100 and a large amount of current flows to the first collector plate 120, thereby blocking the flow of current.

The first connecting part 121c may be positioned inside the first resin part 122. In an implementation, the fuse region may also be positioned inside the first resin part 122. For example, the first connecting part 121c (having the fuse hole 121f therein) may be covered by the first resin part 122.

The first resin part 122 may be integrally formed with the first lead part 121 so as to cover the first connecting part 121c. For example, the first resin part 122 may be insert-molded to the first lead part 121 to entirely cover the first connecting part 121c to then be integrally formed with the first lead part 121. The first resin part 122 may be made of, e.g., one of polypropylene and/or perfluorinated acid (PFA).

For example, a strength of the first collector plate 120 may be reinforced by insert-molding the first connecting part 121c (that is bent from or in the first lead part 121) made of a metal so as to be entirely covered by the first resin part 122 that is made of an insulating material. In addition, the shape of the first collector plate 120 may be maintained by the first resin part 122, even if the first collector plate 120 is electrically disconnected by the fuse region being melted by heat generated when a high voltage due to a short-circuit is applied to the fuse region. Thus, additional short-circuits (caused by an arc) may be prevented from occurring.

The first terminal part 130 may be made of a metal or equivalents thereof and may be electrically connected to the first collector plate 120. The first terminal part 130 may include the first fastening terminal 131 (received in the first fastening hole 121h of the first collector plate 120) and a first electrode terminal 132 (engaged with the first fastening terminal 131).

The first fastening terminal 131 may pass through the cap plate 171 (described below) and may upwardly extend a predetermined length and may protrude to then be electrically connected to the first collector plate 120 under the cap plate 171. The first fastening terminal 131 may upwardly extend a predetermined length and may protrude from the cap plate 171. A laterally extending flange 131a may be formed under the cap plate 171 so as to prevent the first fastening terminal 131 from being dislodged from the cap plate 171. A region of the first fastening terminal 131 under the flange 131a may be fitted into the first fastening hole 121h of the first collector plate 120 and may be riveted or welded to the first collector plate 120. In addition, a region of the first fastening terminal 131 on the flange 131a may pass through the cap plate 171 and may upwardly extend a predetermined length and may protrude, and the first electrode terminal 132 may be fixed to the region.

The first electrode terminal 132 may have a ring shape due to a first terminal hole 132a passing through top and bottom surfaces of the first electrode terminal 132. The first terminal hole 132a of the first electrode terminal 132 may have a size and a shape corresponding to a horizontal size and shape of the first fastening terminal 131 so as to receive the first fastening terminal 131. The first fastening terminal 131 (that upwardly protrudes from the cap plate 171) may be fitted into the first terminal hole 132a and may then be riveted or welded to the first electrode terminal 132.

The first terminal part 130 may be electrically insulated from the cap plate 171. The first terminal part 130 may be made of, e.g., one selected from aluminum, an aluminum alloy, and/or equivalents thereof. However, the material of the first terminal part 130 is not limited thereto.

The second collector plate 140 may include a second lead part 141 made of a metal or an equivalent thereof, and a second resin part 142 covering a portion of the second lead part 141. The second collector plate 140 may have the same shape as the first collector plate 120, and a repeated detailed description thereof may be omitted.

The second lead part 141 may include a second electrode connection part 141a (connected to the second electrode 111), a second terminal connection part 141b (connected to the second terminal part 150), and a second connecting part 141c (connecting the second electrode connection part 141a and the second terminal connection part 141b). In an implementation, the second lead part 141 may be formed as a single body. In addition, the second lead part 141 may be formed in a substantially inverted-L shape, i.e., ']' shape. The second lead part 141 may be made of, e.g., one selected from copper, a copper alloy, and/or equivalents thereof. However, the material of the second lead part 141 is not limited thereto.

The second electrode connection part 141a may be welded to the second electrode uncoated portion 111a of the electrode assembly 110 and may be arranged to stand in a vertical direction, e.g., an up and down direction in FIG. 1B. The second terminal connection part 141b may be welded to the second terminal part 150 and may be arranged in a substantially horizontally lying position to be parallel with the cap plate 170, which will be described below. The second connecting part 141c may have one side connected to the second electrode connection part 141a and another side connected to the second terminal connection part 141b.

The second connecting part 141c may extend from a top end of the second electrode connection part 141a, and may be bent and may further extend a predetermined length in a substantially inverted-L shape, i.e., ']' shape. For example, the second connecting part 141c may extend from the second electrode connection part 141a in a vertically standing shape, and may be, e.g., vertically, bent to be parallel with the cap plate 170 (which will be described below) to then be connected to the second terminal connection part 141b. A fuse region (having a smaller sectional area than other regions of the second connecting part 141c) may be provided at the other side of the second connecting part 141c. The second connecting part 141c may be positioned inside the second resin part 142.

The second resin part 142 may be integrally formed with the second lead part 141 so as to cover the second connecting part 141c. For example, the second resin part 142 may be insert-molded to the second lead part 141 to entirely cover the second connecting part 141c to then be integrally formed with the second lead part 141. The second resin part 142 may be made of, e.g., one of polypropylene and/or perfluorinated acid (PFA).

For example, the strength of the second collector plate 140 may be reinforced by insert-molding the second connecting part 141c (that is bent from the second lead part 141 made of a metal) so as to be entirely covered by the second resin part 142 made of an insulating material. In addition, the second collector plate 140 may help prevent additional short-circuit from occurring due to an arc, which may occur when the fuse region is melted by a high voltage applied thereto.

The second collector plate 140 may have substantially the same configuration as the first collector plate 120.

The second terminal part 150 may be made of a metal or equivalents thereof and may be electrically connected to the second collector plate 140. The second terminal part 150 may include a second fastening terminal 151 (received in the second fastening hole 141h of the second collector plate 140) and a second electrode terminal 152 (engaged with the second fastening terminal 151).

The second fastening terminal 151 may pass through the cap plate 171 (to be described below) and may upwardly extend a predetermined length and may protrude to then be electrically connected to the second collector plate 140 under the cap plate 171. A region of the second fastening terminal 151 under a flange 151a may be fitted into the second fastening hole 141h of the second collector plate 140 and may be riveted or welded to the second collector plate 140. In addition, a region of the second fastening terminal 151 on the flange 151a may pass through the cap plate 171 and may upwardly extend a predetermined length and protrude, and the second electrode terminal 152 may be fixed to the region. The second terminal part 150 may have substantially the same configuration as the first terminal part 130.

The case 160 may be made from an electrically conductive metal, e.g., steel plated with aluminum, an aluminum alloy, or nickel, and may be formed in an approximately rectangular parallelepiped so as to form a space for receiving the electrode assembly 110, the first collector plate 120, and the second collector plate 140. FIGS. 1A and 1B illustrate an assembled state in which the case 160 and the cap assembly 170 are combined with each other, and an opening is not illustrated. For example, the opening may be a substantially opened peripheral portion of the cap assembly 170. In an implementation, an internal surface of the case 160 may be insulated, so that the case 160 may be insulated from the electrode assembly 110, the first collector plate 120, the second collector plate 140, and the cap assembly 170.

The cap assembly 170 may be combined or coupled with the case 160. For example, the cap assembly 170 may include a cap plate 171, a seal gasket 172, a plug 173, a safety vent 174, an upper insulation member 175, a lower insulation member 176, a connecting plate 177, a first short-circuit plate 178, and a second short-circuit plate 179.

The cap plate 171 may seal the opening of the case 160 and may be made of a same material as the case 160. For example, the cap plate 171 may be combined or coupled with the case 160 by laser welding. In an implementation, if the cap plate 171 is electrically connected to the first terminal part 130, the cap plate 171 may have the same polarity as the first terminal part 130. Accordingly, the cap plate 171 and the case 160 may have the same polarity.

The seal gasket 172 may be made of an insulating material and may be between each of the first fastening terminal 131 and the second fastening terminal 151 and the cap plate 171, thereby sealing portions between each of the first fastening terminal 131 and the second fastening terminal 151 and the cap plate 171. The seal gasket 172 may help prevent external moisture from flowing into the rechargeable battery 100 or an electrolyte in the rechargeable battery 100 from flowing out.

The plug 173 may seal an electrolyte injection hole 171a of the cap plate 171. The safety vent 174 may be installed in a vent hole 171b of the cap plate 171 and may have a notch 174a configured to be opened at a preset pressure.

The upper insulation member 175 may be between the second short-circuit plate 179 and the cap plate 171 to electrically insulate the second short-circuit plate 179 and the cap plate 171 from each other. In addition, the upper insulation member 175 may make close contact with the cap plate 171. Further, the upper insulation member 175 may also make close contact with the seal gasket 172. The upper insulation member 175 may insulate the second terminal part 150 and the cap plate 171 from each other.

The lower insulation member 176 may be between each of the first collector plate 120 and the second collector plate 140 and the cap plate 171 to help prevent an undesirable electrical short-circuit from occurring. For example, the lower insulation member 176 may help prevent a short-circuit between the first collector plate 120 and the cap plate 171 and a short-circuit between the second collector plate 140 and the cap plate 171. In addition, the lower insulation member 176 may be between each of the first electrode terminal 123 and the second electrode terminal 133 and the cap plate 171, thereby helping to prevent unnecessary short-circuits between each of the first electrode terminal 123 and the second electrode terminal 133 and the cap plate 171.

The connecting plate 177 may be interposed between the first electrode terminal 132 and the cap plate 171 and may make close contact with the cap plate 171 and the seal gasket 172 through the first electrode terminal 132. The connecting plate 177 may electrically connect the first electrode terminal 132 and the cap plate 171 to each other.

The first short-circuit plate 178 may be between the upper insulation member 175 and the cap plate 171 in a short-circuit hole 171c of the cap plate 171. The first short-circuit plate 178 may be formed of an inverting plate having a downwardly convex round part, and an edge part fixed to the cap plate 171. The first short-circuit plate 178 may be inverted to upwardly convexly protrude when the internal pressure of the rechargeable battery 100 exceeds a predefined pressure due to, e.g., over-charge. In an implementation, the first short-circuit plate 178 and the cap plate 171 may have the same polarity.

The second short-circuit plate 179 may be disposed at an outside of and spaced apart from the cap plate 171, e.g., above the upper insulation member 175. The second short-circuit plate 179 may allow the second electrode terminal 152 to be inserted thereto, and may extend to cover the short-circuit hole 171c. The second short-circuit plate 179 may be electrically connected to the second electrode terminal 152. The second short-circuit plate 179 may make contact with the upwardly convexly protruding first short-circuit plate 178 when the internal pressure of the rechargeable battery 100 exceeds the predefined pressure due to, e.g., over-charge, thereby causing or inducing an electrical short-circuit. If the short-circuit is induced, a large amount of current may flow, generating heat. In an implementation, a fuse region having the fuse hole 121f of the first collector plate 120 may thus be melted, thereby functioning as a fuse.

Figure 4:
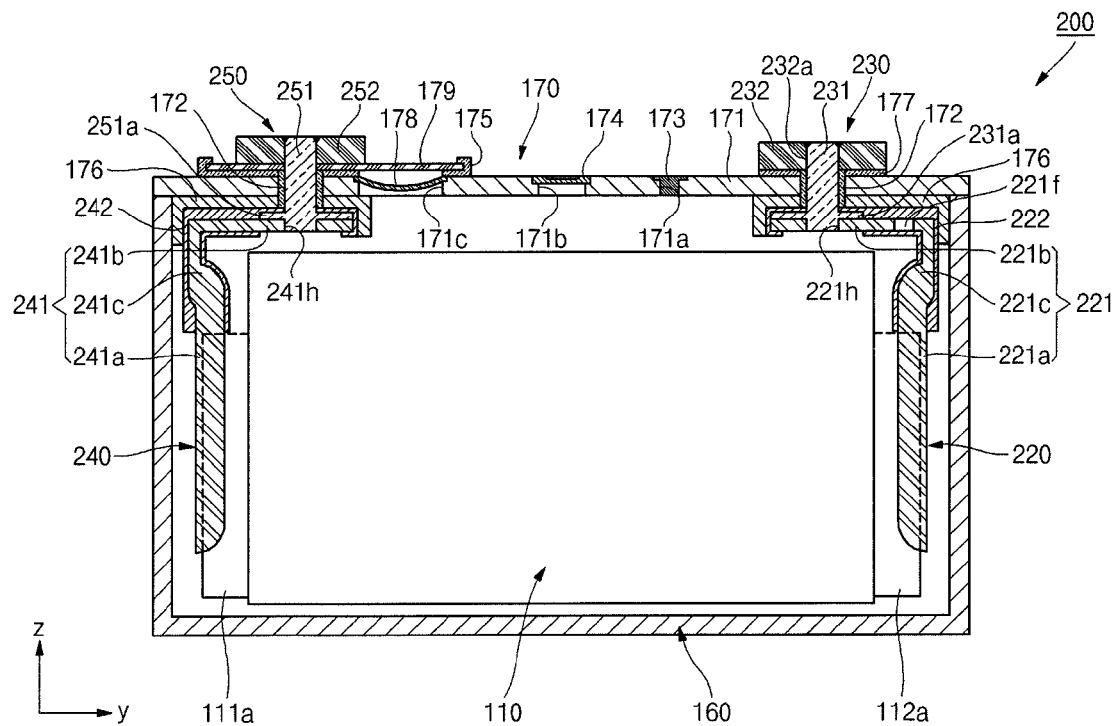
FIG. 4 illustrates a cross-sectional view of a rechargeable battery according to another embodiment.

FIG. 4 illustrates a cross-sectional view of a rechargeable battery according to another embodiment.

Referring to FIG. 4, the rechargeable battery 200 according to the present embodiment may include an electrode assembly 110, a first collector plate 220, a first terminal part 230, a second collector plate 240, a second terminal part 250, a case 160, and a cap assembly 170.

The rechargeable battery 200 may be substantially the same as the rechargeable battery 100 shown in FIGS. 1A and 1B, in view of the electrode assembly 110, the case 160, and the cap assembly 170. Thus, the following description will focus on the first collector plate 220, the first terminal part 230, the second collector plate 240, and the second terminal part 250 of the rechargeable battery 200, which may be different from the corresponding components of the rechargeable battery 100.

First, the first collector plate 220 may include a first lead part 221 made of a metal or an equivalent thereof, and a first resin part 222 covering a portion of the first lead part 221. The first resin part 222 may cover portions of the first fastening terminal 231 and the first lead part 221 after it is combined with the first lead part 221 and the first fastening terminal 231 of the first terminal part 230.

FIG. 5 illustrates an enlarged perspective view of the first collector plate 220 and the fastening terminal 231.

Hereinafter, configurations of the first collector plate 220 and the first fastening terminal 231 will be described with reference to FIGS. 4 and 5.

The first lead part 221 may be electrically connected to the first electrode 111 and the first fastening terminal 231 of the first terminal part 230. The first lead part 221 may include a first electrode connection part 221a (connected to the first electrode Ill), a first terminal connection part 221b (connected to the first fastening terminal 231), and a first connecting part 221c (connecting the first electrode connection part 221a and the first terminal connection part 221b). The first lead part 221 may be formed as a single body, e.g., may be integrally formed as a one-piece unit. The first lead part 221 may be formed in a substantially inverted-L shape, i.e., ']' shape. The first lead part 221 may be made of, e.g., aluminum or an aluminum alloy. However, the material of the first lead part 221 is not limited thereto.

The first electrode connection part 221a may be welded to the first electrode uncoated portion 111a of the electrode assembly 110 and may be arranged to stand in a vertical direction, e.g., an up and down direction in FIG. 4. The first electrode connection part 221a may include as many first electrode connection parts as electrode assemblies that are received in the case 160. For example, each of the first electrode connection parts 221a may be welded to the first electrode uncoated portion 111a of the electrode assembly 110. The number of the first electrode connection parts 221a is exemplified as 4 in FIG. 5, but the embodiments are not limited thereto.

The first terminal connection part 221b may be welded to the first fastening terminal 231 and may be arranged in a substantially horizontally lying position to be parallel with the cap plate 170. A first fastening hole 221h may be formed in the first terminal connection part 221b and may pass through top and bottom surfaces of the first terminal connection part 221b. The first fastening terminal 231 may be fitted into the first fastening hole 221h to be engaged therewith. For example, the first fastening hole 221h may be sized to correspond to the first fastening terminal 231 to allow the first fastening terminal 231 to be received therein.

The first connecting part 221c may have one side connected to the first electrode connection part 221a and another side connected to the first terminal connection part 221b. The first connecting part 221c may extend from a top end of the first electrode connection part 221a, and may be bent and may further extend a predetermined length in a substantially inverted-L shape, i.e., ']' shape. For example, the first connecting part 221c may extend from the first electrode connection part 221a in a vertically standing shape, and may be vertically bent to be parallel with the cap plate 170 to then be connected to the first terminal connection part 221b.

A fuse region having a smaller sectional area than other regions of the first connecting part 221c may be provided at the other side of the first connecting part 221c. For example, the first connecting part 221c may have a fuse hole 221f at its other side while passing through top and bottom surfaces of the first connecting part 221c and may include the fuse region having a smaller sectional area than other regions of the first connecting part 221c. The fuse hole 221f have an oblong elongated shape in a widthwise direction, and may include two fuse holes. However, the embodiments do not limit the shape and number of the fuse hole 221f. The fuse region may be melted by heat generated when a short-circuit occurs to the rechargeable battery 200 and a large amount of current flows to the first collector plate 220, thereby blocking the flow of current.

In addition, the first connecting part 221c may be positioned inside the first resin part 222. In an implementation, the fuse region may also be positioned inside the first resin part 222. For example, the first connecting part 221c may be covered by the first resin part 222.

The first resin part 222 may be formed in the first lead part 221 so as to cover the first connecting part 221c and the first terminal connection part 221b (engaged with the first fastening terminal 231). For example, the first resin part 222 may be insert-molded to the first lead part 221 to entirely cover the first terminal connection part 221b and the first connecting part 221c to then be integrally formed with the first lead part 221. For example, a lower portion of the first terminal connection part 221b may be exposed to the outside.

The first resin part 222 may be made of, e.g., one of polypropylene and/or perfluorinated acid (PFA).

For example, the first collector plate 220 may be insert-molded such that the first connecting part 221c of the first lead part 221 (made of a metal) and the first terminal connection part 221b (engaged with the first fastening terminal 231) are covered by the first resin part 222 made of an insulating material, thereby increasing a coupling force between the first collector plate 220 and the first fastening terminal 231. In addition, a shape of the first collector plate 220 may be maintained by the first resin part 222, even if it is electrically disconnected by the fuse region melted by heat generated when a high voltage due to a short-circuit is applied to the fuse region, and may help prevent additional short-circuit from occurring due to an arc.

The first terminal part 230 may be made of a metal or equivalents thereof and may be electrically connected to the first collector plate 220. The first terminal part 230 may include the first fastening terminal 231 received in the first fastening hole 221h of the first collector plate 220, and a first electrode terminal 232 engaged with the first fastening terminal 231.

The first fastening terminal 231 may pass through the cap plate 171 and may upwardly extend a predetermined length and may protrude to then be engaged with the first fastening hole 221h of the first collector plate 220 under the cap plate 171. A laterally extending flange 231a may be under the cap plate 171 so as to help prevent the first fastening terminal 231 from being dislodged from the cap plate 171. A region of the first fastening terminal 231 under the flange 231a may be fitted into the first fastening hole 221h of the first collector plate 220 and may be riveted or welded to the first collector plate 220. In addition, the first fastening terminal 231 (engaged with the first fastening hole 221h of the first collector plate 220) may be covered by the first resin part 222. In addition, a region of the first fastening terminal 231 on the flange 231a may pass through the cap plate 171 and may upwardly extend a predetermined length and protrude, and the first electrode terminal 232 may be fixed to the region.

The first electrode terminal 232 may have a ring shape due to a first terminal hole 232a passing through top and bottom surfaces of the first electrode terminal 232. The first terminal hole 232a of the first electrode terminal 232 may have a size and a shape corresponding to a horizontal size and shape of the first fastening terminal 231 so as to receive the first fastening terminal 231. The first electrode terminal 232 (upwardly protruding from the cap plate 171) may be fitted into the first terminal hole 232a and may then be riveted or welded to the first electrode terminal 232.

The first terminal part 230 may be electrically insulated from the cap plate 171.

The first terminal part 230 may be made of, e.g., one selected from aluminum, an aluminum alloy, and equivalents thereof. However, the material of the first terminal part 230 is not limited thereto.

The second collector plate 240 may include a second lead part 241 made of a metal or an equivalent thereof, and a second resin part 242 covering a portion of the second lead part 241. The second collector plate 240 may have the same shape as the first collector plate 220, except for a fuse region, and a repeated detailed description thereof may be omitted.

The second lead part 241 may include a first electrode connection part 241a (connected to the second electrode 112), a first terminal connection part 241b (connected to the second fastening terminal 251), and a first connecting part 241c (connecting the first electrode connection part 241a and the first terminal connection part 241b). The first lead part 241 may be formed as a single body, e.g., may be integrally formed as a one-piece unit. In addition, the second lead part 241 may be formed in a substantially inverted-L shape, i.e., '] ' shape. The second lead part 241 may be made of, e.g., copper or a copper alloy. However, the material of the second lead part 241 is not limited thereto.

The second electrode connection part 241a may be welded to the second electrode uncoated portion 111a of the electrode assembly 110 and may be arranged to stand in a vertical direction, e.g., an up and down direction in FIG. 4. The second terminal connection part 241b may be welded to the second fastening terminal 251 and may be arranged in a substantially horizontally lying position to be parallel with the cap plate 170. The second connecting part 241c may have one side connected to the second electrode connection part 241a and another side connected to the second terminal connection part 241b.

The second connecting part 241c may extend from a top end of the second electrode connection part 241a, and may be bent and may further extend a predetermined length in a substantially inverted-L shape, i.e., '] ' shape. For example, the second connecting part 241c may extend from the second electrode connection part 241a in a vertically standing shape, and may be, e.g., vertically, bent to be parallel with the cap plate 170, to then be connected to the second terminal connection part 241b. The second connecting part 241c may be positioned inside the second resin part 242.

The second resin part 242 may be formed on the second lead part 241 to cover the second connecting part 241c and the second terminal connection part 241b engaged with the second fastening terminal 251. For example, the second resin part 242 may be insert-molded to the second lead part 241 to entirely cover the second connecting part 241c and the second terminal connection part 241b to then be integrally formed with the second lead part 241. A lower portion of the second terminal connection part 241b may be exposed to the outside. In an implementation, the first resin part 222 may be made of, e.g., one of polypropylene and/or perfluorinated acid (PFA).

For example, the second collector plate 240 may be insert-molded such that the second connecting part 241c of the first lead part 241 (made of a metal) and the first terminal connection part 241b (engaged with the second fastening terminal 251) may be covered by the second resin part 242 made of an insulating material, thereby increasing a coupling force between the second lead part 241 and the second fastening terminal 251. In addition, a shape of the second collector plate 240 may be maintained by the second resin part 242, even if it is electrically disconnected by the fuse region melted by heat generated due to an external short-circuit, and may help prevent additional short-circuit from occurring due to an arc.

The second terminal part 250 may made of a metal or equivalents thereof and may be electrically connected to the second collector plate 240. The second terminal part 250 may include a second fastening terminal 251 (received in the second fastening hole 241h of the second collector plate 240) and a second electrode terminal 252 (engaged with the second fastening terminal 251).

The second fastening terminal 251 may pass through the cap plate 171 and may upwardly extend a predetermined length and may protrude to then be engaged with the second collector plate 240 under the cap plate 171. A region of the second fastening terminal 251 under a flange 251a may be fitted into the second fastening hole 241h of the second collector plate 240 and may be riveted or welded to the second collector plate 240. In addition, a region of the second fastening terminal 251 on the flange 251a may pass through the cap plate 171 and may upwardly extend a predetermined length and protrude, and the second electrode terminal 252 may be fixed to the region. The second terminal part 250 may have a same shape as the first terminal part 230.

By way of summation and review, rechargeable batteries may be configured by housing an electrode assembly including a positive electrode, a negative electrode, and a separator (positioned between the positive and negative electrodes) as an insulator in a case, together with an electrolyte, and sealing the case with a cap assembly. Positive and negative electrode terminals may be connected to the electrode assembly and may be exposed to or may protrude to the outside through the cap plate.

An undesirable arc may occur to the rechargeable battery if a fuse region is melted by a short-circuit. The arc may be transferred to other regions of the rechargeable battery, as well as the fuse region, resulting in ignition or explosion.

Accordingly, the embodiments provide a rechargeable battery having improved safety against arcs. Embodiments provide a rechargeable battery, which can reinforce the strength of a collector plate by insert-molding resin to cover some portions of the collector plate while preventing additional damages due to arc jump.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A rechargeable battery, comprising:
an electrode assembly including a first electrode, a second electrode, and a separator interposed between the first electrode and the second electrode;
a case receiving the electrode assembly therein and having a top end opening;

a cap assembly sealing the top end opening of the case, the cap assembly including a first terminal part and a second terminal part outwardly protruding; and a first collector plate received inside the case and electrically connecting the first electrode and the first terminal part, wherein the first collector plate includes:

a first lead part including a first electrode connection part connected to the first electrode, a first terminal connection part connected to the first terminal part, and a first connecting part electrically connecting the first electrode connection part and the first terminal connection part, the first connecting part extending from a top portion of the first electrode connection part and having a bend so as to have an extending part that extends toward an upper portion of the electrode assembly; and a first resin part on the first lead part, the first resin part covering all sides of the first connecting part, covering a portion of the first electrode connection part, and extending beyond the bend to cover the extending part.

2. The rechargeable battery as claimed in claim 1, wherein the first resin part is insert-molded to the first lead part to be integrally engaged with the first lead part, and conformally covers a portion of the first lead part, the bend, and the extending part.

3. The rechargeable battery as claimed in claim 1, wherein the first resin part is made of one of polypropylene and perfluorinated acid.

4. The rechargeable battery as claimed in claim 1, wherein the first connecting part has one side connected to the first electrode connection part and another side connected to the first terminal connection part.

5. The rechargeable battery as claimed in claim 1, wherein the first connecting part includes a fuse region, the fuse region having a smaller sectional area than other regions of the first connecting part.

6. The rechargeable battery as claimed in claim 5, wherein the fuse region is positioned inside the first resin part such that all sides of the fuse region are conformally covered by the first resin part.

7. The rechargeable battery as claimed in claim 5, wherein the fuse region is positioned at one side of the first connecting part connected to the first terminal connection part and has a fuse hole formed therein.

8. The rechargeable battery as claimed in claim 1, wherein the first resin part is insert-molded to the first lead part that is engaged with a first fastening terminal of the first terminal part, the first resin part conformally covering the first connecting part and the first terminal connection part.

9. The rechargeable battery as claimed in claim 1, further comprising a second collector plate received inside the case, the second collector plate electrically connecting the second electrode and the second terminal part.

10. The rechargeable battery as claimed in claim 9, wherein the second collector plate includes:

a second lead part including a second electrode connection part connected to the second electrode, a second terminal connection part connected to the second terminal part, and a second connecting part electrically connecting the second electrode connection part and the second terminal connection part; and a second resin part on the second lead part, the second resin part covering the second connecting part.

11. The rechargeable battery as claimed in claim 10, wherein the second resin part is insert-molded to the second lead part to be integrally engaged with the second lead part.

12. The rechargeable battery as claimed in claim 10, wherein the second resin part is made of one of polypropylene and perfluorinated acid.

13. The rechargeable battery as claimed in claim 10, wherein the second connecting part has one side connected to the second electrode connection part and another side connected to the second terminal connection part, the second connecting part extending from a top portion of the second electrode connection part to then be bent toward an upper portion of the electrode assembly.

14. The rechargeable battery as claimed in claim 10, wherein the second resin part is insert-molded to the second lead part that is engaged with a second fastening terminal of the second terminal part, the second resin part covering the second connecting part and the second terminal connection part.

15. The rechargeable battery as claimed in claim 1, wherein the cap assembly includes:

a cap plate sealing the case; and a vent plate in the cap plate, the vent plate being configured to be opened when an internal pressure of the case exceeds a preset pressure.

16. The rechargeable battery as claimed in claim 15, further comprising:

a first short-circuit plate on a short-circuit hole in the cap plate, the first short-circuit plate being electrically connected to the cap plate and upwardly convexly protruding when the internal pressure of the case exceeds a preset pressure; and a second short-circuit plate upwardly spaced apart from the first short-circuit plate and being electrically connected to the second terminal part.

* * * * *